(12) United States Patent
Andersson

(10) Patent No.: US 7,513,698 B2
(45) Date of Patent: Apr. 7, 2009

(54) RELEASABLE OPTICAL CONNECTOR

(75) Inventor: Hans Magnus Emil Andersson, Jarfalla (SE)

(73) Assignee: Zarlink Semiconductor AB, Jarfalla (SE)

( * ) Notice: Subject to any disclaimer, the term of this patent is extended or adjusted under 35 U.S.C. 154(b) by 0 days.

(21) Appl. No.: 11/562,623

(22) Filed: Nov. 22, 2006

(65) Prior Publication Data

US 2008/0112674 A1    May 15, 2008

Related U.S. Application Data

(60) Provisional application No. 60/865,098, filed on Nov. 9, 2006.

(51) Int. Cl.
*G02B 6/36* (2006.01)
(52) U.S. Cl. ............................ 385/92; 385/88
(58) Field of Classification Search .................. 385/39, 385/52, 76, 77, 88–94, 134
See application file for complete search history.

(56) References Cited

U.S. PATENT DOCUMENTS

| 6,814,502 | B2 * | 11/2004 | Chiu et al. | 385/88 |
| 6,832,856 | B2 * | 12/2004 | Chiu et al. | 385/53 |
| 6,846,114 | B2 * | 1/2005 | Chiu et al. | 385/88 |
| 6,863,448 | B2 * | 3/2005 | Chiu et al. | 385/88 |
| 6,883,971 | B2 * | 4/2005 | Chiu et al. | 385/53 |
| 7,114,857 | B1 * | 10/2006 | Kayner et al. | 385/88 |

* cited by examiner

*Primary Examiner*—Kevin S Wood
*Assistant Examiner*—John M Bedtelyon
(74) *Attorney, Agent, or Firm*—Lawrence E. Laubscher, Jr.

(57) ABSTRACT

An optic fiber connection arrangement has a module mountable on a printed circuit board, and an optic fiber coupler including mating components. One of the mating components is adapted for coupling into the module. A frame supports one of the components. The frame is releasably latchable to the module so as to couple and decouple the mating component to the module. In this way, the optic fiber coupler can be removed from the module by releasing the frame. The other mating component can be removed from the one mating component after removal of the frame from the module.

2 Claims, 6 Drawing Sheets

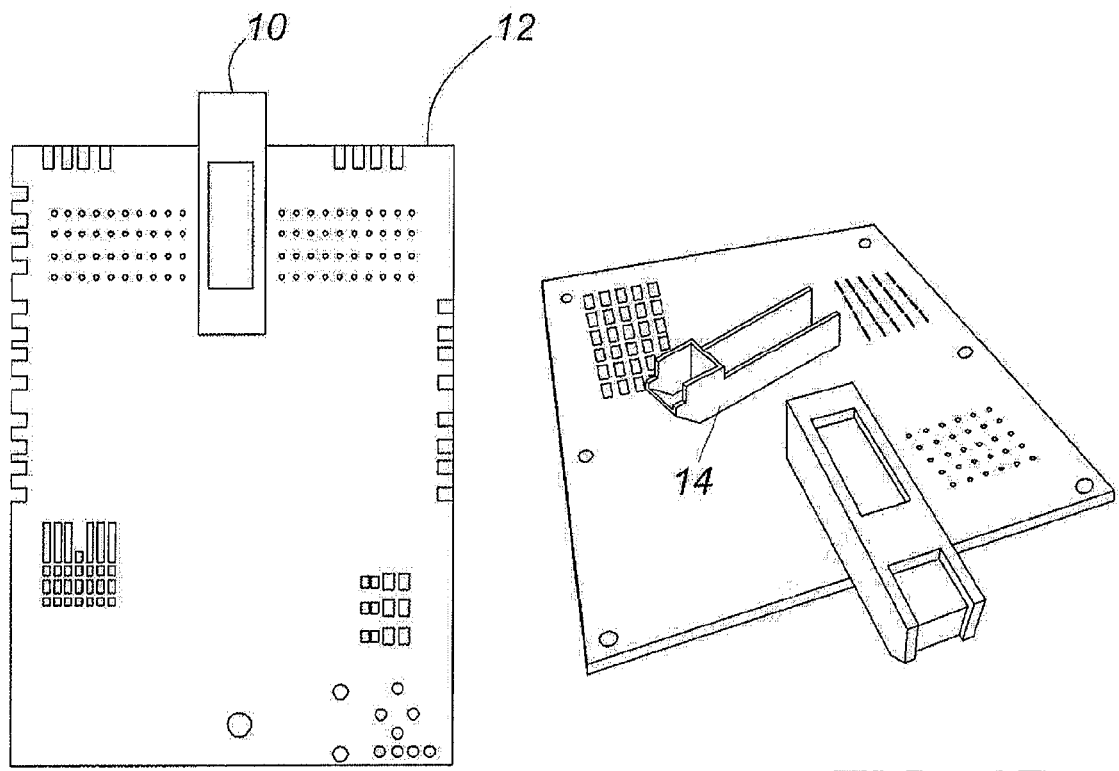
FIG. 1A
FIG. 1B
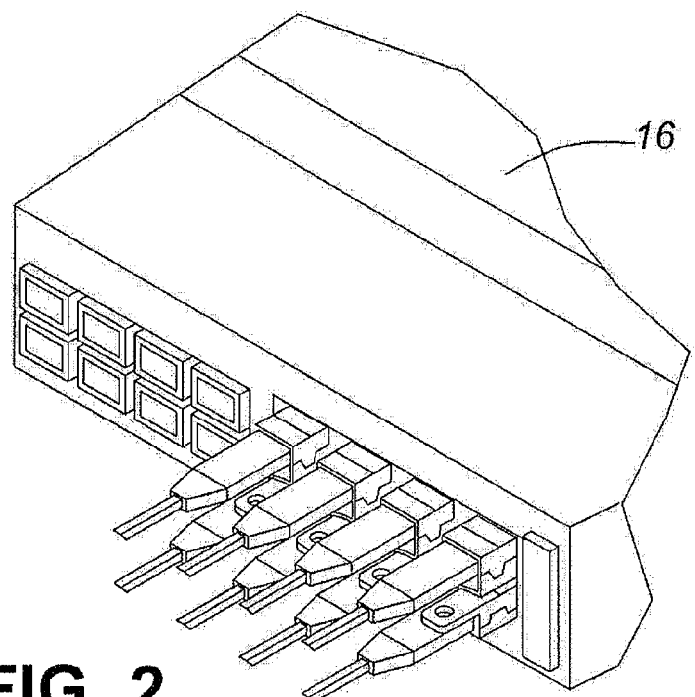
FIG. 2

RELEASABLE OPTICAL CONNECTOR

CROSS REFERENCE TO RELATED APPLICATION

This application claims the benefit under 35 USC 119(e) of prior U.S. provisional application No. 60/865,098, filed Nov. 9, 2006, the contents of which are herein incorporated by reference.

FIELD OF THE INVENTION

This invention relates to releasable optical connectors, and in particular, but not exclusively to connectors for use with a family of optical modules known as QSFP (Quad Small-Form Factor Pluggable) modules.

BACKGROUND OF THE INVENTION

There is a need in the optoelectronics industry to provide for the latching and removal of optical transceiver modules inserted into cage on a customer board. One such module is known as a Parallel Fiber Optics Module (PFOM) and is designed to be z-pluggable into the cage of the customer board. These modules provide a transceiver function interfacing to optical signals with optical fibers. The new family of QSFP modules referred to above is described in the QSFP multi-source agreement (MSA), the contents of which are herein incorporated by reference, and available from the QSFP Chair and Editor, McData Corporation, 4 McData Parkway, Broomfield, Colo. 80021.

A typical cage 10 and a printed circuit board (PCB) 12 are shown in FIGS. 1A and 1B, along with inserted module 14. The module 14 has an edge connector which plugs into a complementary edge connector on the printed circuit board. As will be seen in FIG. 1B, the QSFP module is inserted into the cage 10 mounted on the PCT 12. Both examples are for QSFP modules.

The QSFP is a z-pluggable module. This offers attractive features for the customer:

a) By fitting into a pre-assembled cage on the customer board and being readily installed and removed, it allows ports to be populated on demand and also offers ease of in-the-field replacement.

b) It offers significant improvements in board and edge area density and power consumption as compared to serial SFP based solutions where four discrete SFPs would be required.

c) It provides a customer management interface in the same way as SFP modules.

The QSFP is intended to be fitted with a bail-latching mechanism, though this is not defined in detail within the MSA, and hence this is being left to the market to decide on a suitable solution.

Latch mechanisms are used today in a variety of z-pluggable modules, e.g. SFP and XFP modules. The QSFP solution, however, presents unique problems that have not been encountered previously as no family of z-pluggable modules has previously been developed. Z-pluggable modules are modules that can be plugged into the front panel of a housing 16, as shown in FIG. 2.

The main problem relates to the optical fiber. The QSFP is a PFOM based module, and as such uses an industry standard MPO/MTP fiber connector as is used in all multiple fiber ribbon cables. The MPO/MTP is a spring-loaded connector that snaps into the receptacle of the QSFP. Insertion is relatively straightforward. Removal or de-insertion requires a sliding section on the connector to be drawn back which disengages the connector, thus allowing removal. This in itself is not a problem. However, problems arise when the end-user desires to use multiple QSFPs in a high density solution. Three example scenarios of close packed solutions are:

a) Ganged: QSFP modules are placed adjacent to one another b) Stacked: when QSFP modules are placed on top of each other c) Belly-to-Belly: this is when QSFP modules are placed on either side of a PCB. A typical Belly-to-Belly solution is shown in FIG. 2.

In all the above high packing density configurations, the problem becomes how to remove the optical fiber from modules away from the outer corners. At maximum packing density it is not possible for the optical fiber to be readily removed from an inner module 14 inserted into the corresponding cage 10 Therefore under normal conditions the end-user is forced to trade-off density against ergonomic practicalities for the QSFP. The difficulty of removing the optical fiber has a knock-on effect in that it also means that the QSFP module cannot be removed using conventional bail latching mechanisms since this requires movement of the latch that is precluded by the presence of the optical fiber. The inability to remove the QSFP module when the fiber is attached is a significant problem.

SUMMARY OF THE INVENTION

The novel latching mechanism in accordance with the invention addresses the problem of QSFP and fiber removal in high-density QSFP configurations by combining the removal of the QSFP with the removal of the optical fiber. The removal mechanism de-attaches the QSFP with the optical fiber, allowing the subsequent removal of the fiber from the QSFP. The invention provides a spring loaded latch mechanism with a geometry that allows the module to be released with the fiber attached to the module. Embodiments of the invention employ an asymmetrically placed handle and a separate release tool.

In accordance with a first aspect of the invention there is provided an optic fiber connection arrangement comprising a module mountable on a printed circuit board; an optic fiber connector coupleable into said module; and a releasably latchable frame supporting said optic fiber connector; whereby said optic fiber connector can be removed from said module by releasing said frame.

Embodiments of the invention allow easy removal of QSFP in high density, stacked, ganged or belly-to-belly configurations without need to remove optical fiber, and easy removal of optical fiber in high-density configurations.

A spring-loaded embodiment allows for the "snap-in" of the QSFP module to the cage. In another embodiment the extended latch is asymmetric. This allows an end-user to clearly identify which module is which in a belly-to-belly configuration. In yet another embodiment, colour coding of the extended latch can be used to match QSFP requirements.

A further aspect of the invention provides an optic fiber connection arrangement comprising a cage adapted to be attached to a printed circuit board; a module for carrying an optic fiber coupler including mating components releasably insertable into said cage; and a release tool for releasing said module from said cage; whereby said optic fiber coupler can be removed from said module by releasing said module and said mating components can be separated after removal of said module from said cage.

BRIEF DESCRIPTION OF THE DRAWINGS

The invention will now be described in more detail, by way of example only, with reference to the accompanying drawings, in which:

FIGS. 1A and 1B are plan views of a standard QSFP cage and module;

FIG. 2 is a perspective view of a typical Belly-to-Belly configuration;

DETAILED DESCRIPTION OF EMBODIMENTS OF THE INVENTION

Figure 3A:
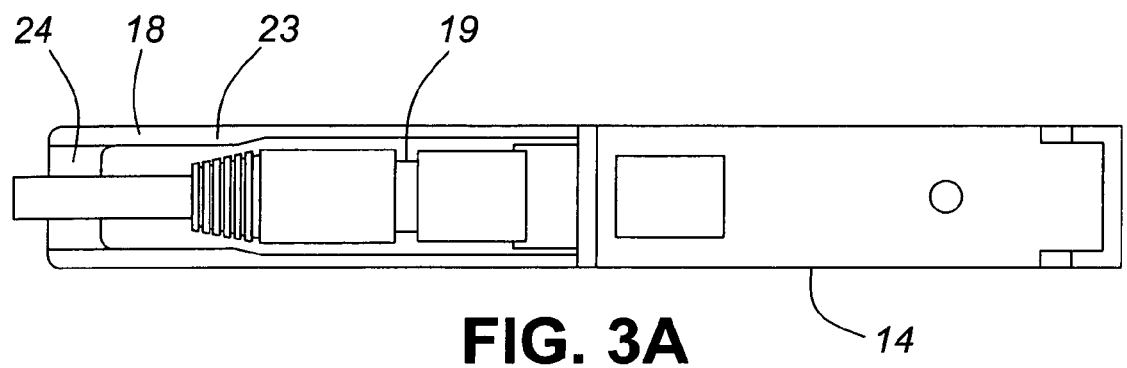
FIG. 3A to 3E are views of an embodiment of an asymmetric QSFP de-latch arrangement in accordance with the invention.
Figure 3B:
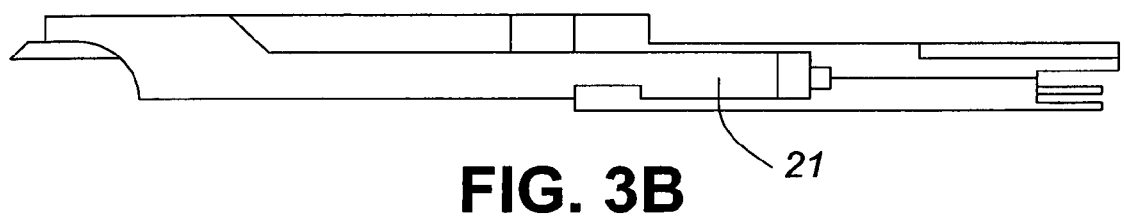
Figure 3C:
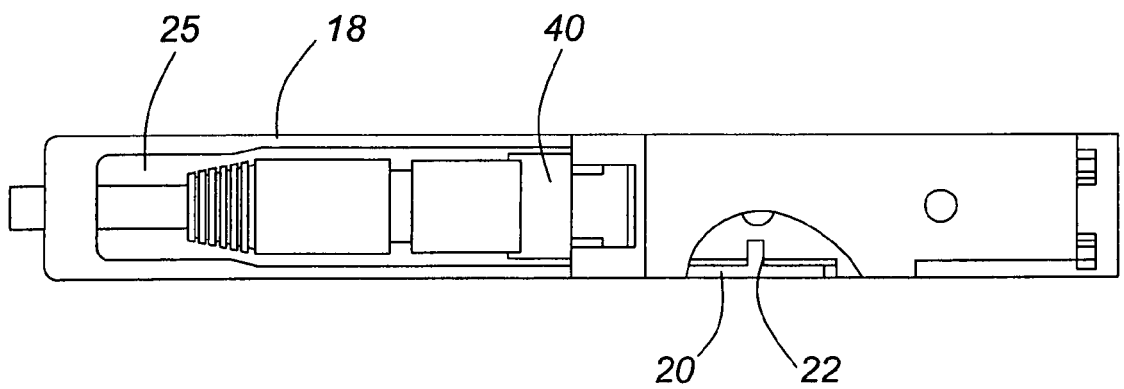
Figure 3D:
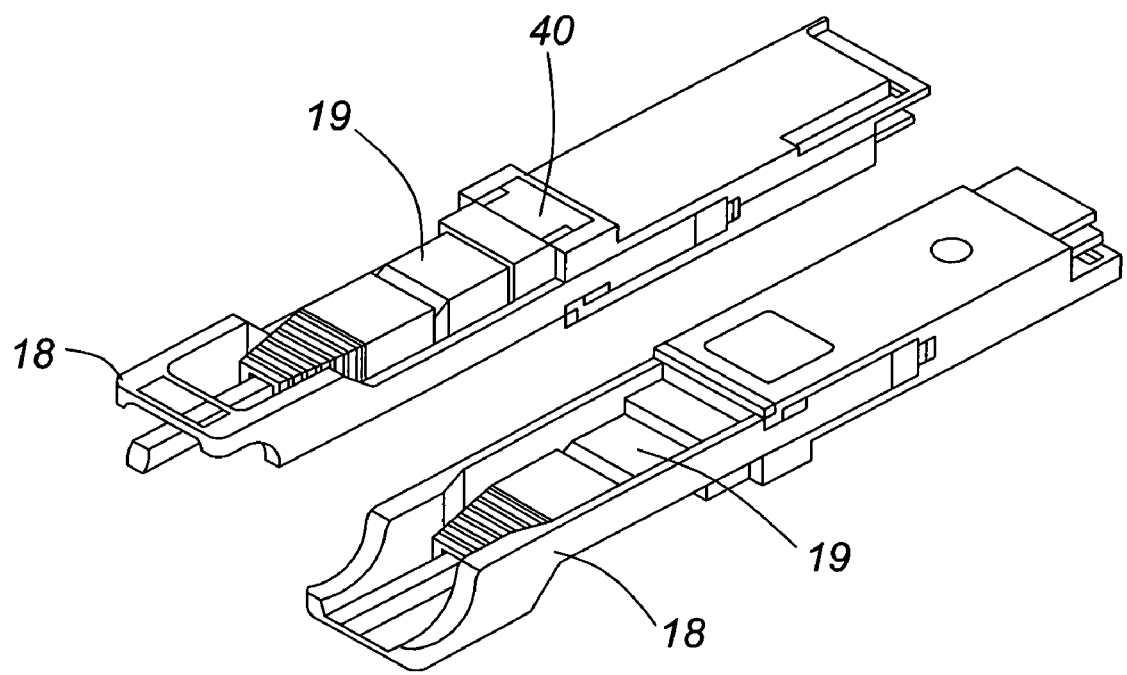
Figure 3E:
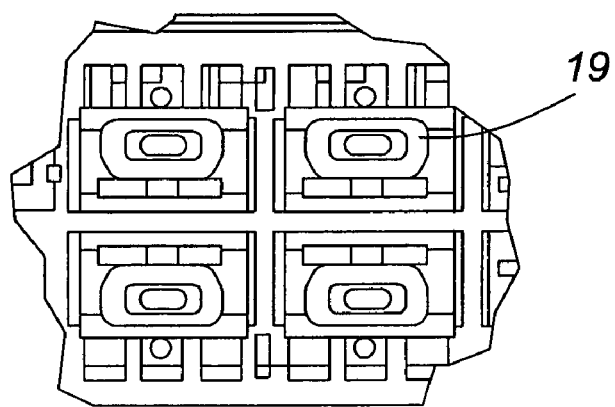

The embodiment shown in FIG. 3 employs a plastic frame 18 or shelf-type pre-loaded latch mechanism surrounding the fiber connector 19. The frame 18, which in this embodiment is made of glass re-enforced (15-30%) PBT+PET (Mylar™) has a pair of lateral protruding limbs 21 that extend into the module 14. In this example, the frame 18 is color coded beige to indicate a 850 nm product.

A pre-loaded spring 20 of the latch mechanism within the module 14 applies force to a lug 22 on the inside of the limbs 21 and ensures (in a piston-like action) that the latch mechanism remains in the locked position, regardless of whether the QSFP module is loaded into the pre-assembled cage 10 or not.

The latch mechanism or frame 18 will stay in its locked position as long as no external force, in the opposite direction (to that force applied by the spring), is applied to the latch mechanism. This is shown in FIGS. 3A to 3E, where the frame containing the optical fiber connector can be seen retained in, and protruding from, the module 14.

The protruding part of the frame comprises a pair of parallel side bars 23 and a cross piece 24 extending therebetween. The parallel side bars define an opening 25 giving access from both sides to the optical fiber connector 19, which is to be coupled to the transceiver in the module.

An important advantage of this embodiment of the invention is that the QSFP module 14 is locked in its resting place, after being inserted in the pre-assembled cage, without any additional steps necessary (i.e. without having to physically move the latch to a locked position). That is the latch automatically snaps into the locked position.

The entire module 14 can be removed from the cage 10 with the fiber connector attached. The fiber connector is also inserted into coupler 40, which engages an optical transceiver on the front of the module 10. When the spring-loaded latch mechanism of the frame 18 is released, it can be removed from the module with the fiber connector 19 and the attached coupler 40.

A variety of alternative embodiments of invention are possible. For example, a standard sliding latch may be employed in the place of a spring-loaded version.

Figure 4A:
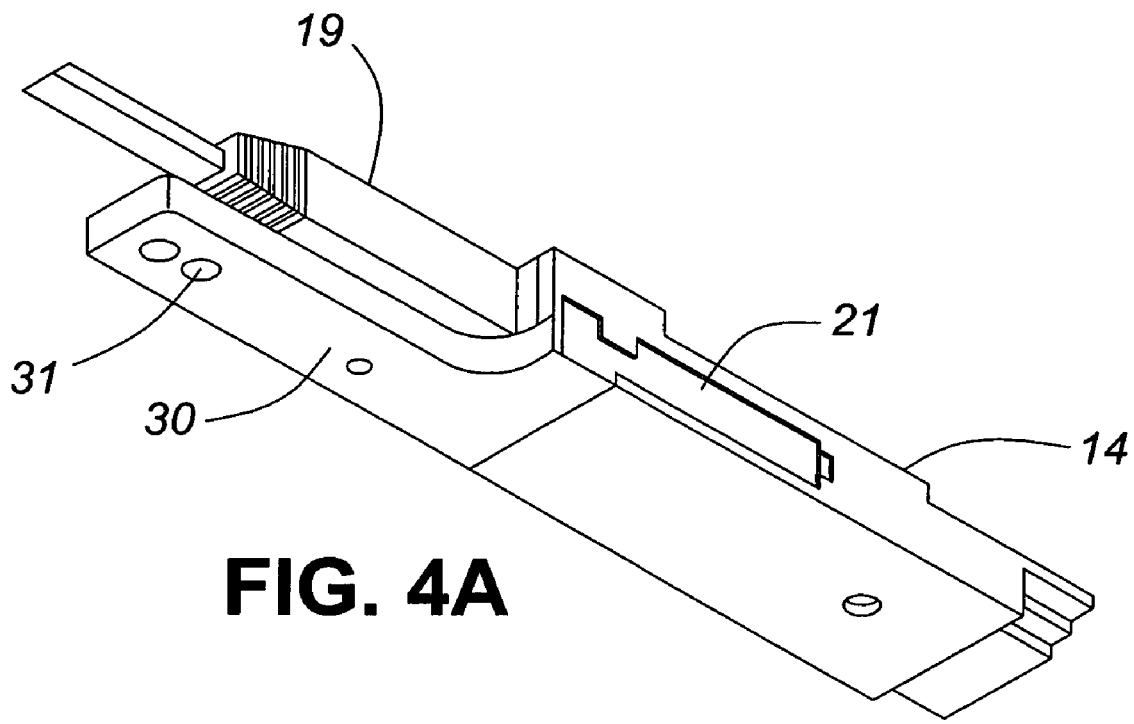
FIGS. 4A to 4B are views of an alternative embodiment of the invention employing an asymmetric extended latch solution.
Figure 4B:
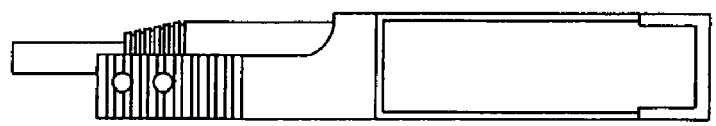
Figure 4C:

In the embodiment shown in FIGS. 4A to 4C, the proximal end of the frame 18 has protruding limbs 21 in the same way as the embodiment of FIGS. 3A to 3E, but the distal end comprises an asymmetric cut-away plate portion 30, which exposes a portion of the fiber connector 19. The plate portion has a hole 31 designed to received a hooked instrument to aid in the removal of the frame from the module. The plate is asymmetric in lateral direction as opposed to vertical direction. The allows the fiber connectors to be identified when the connectors are in a stacked arrangement.

Figure 5A:
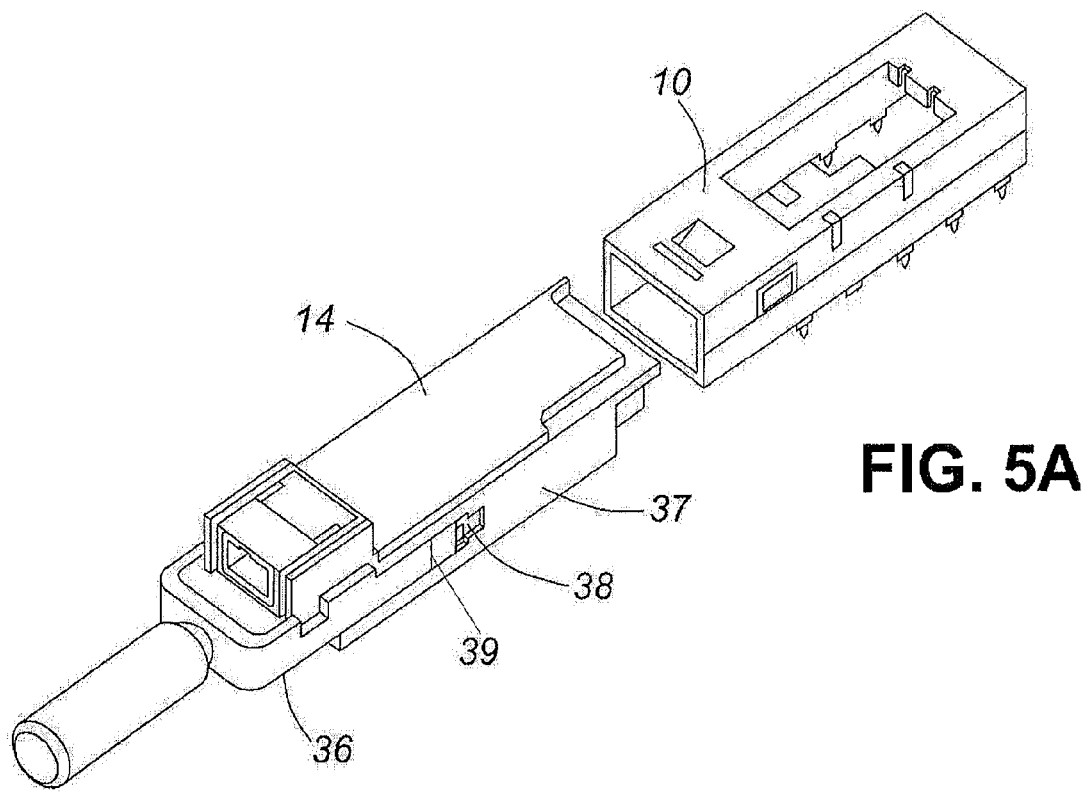
FIGS. 5A to 5D are views of another embodiment employing a tool based de-latch solution.
Figure 5B:
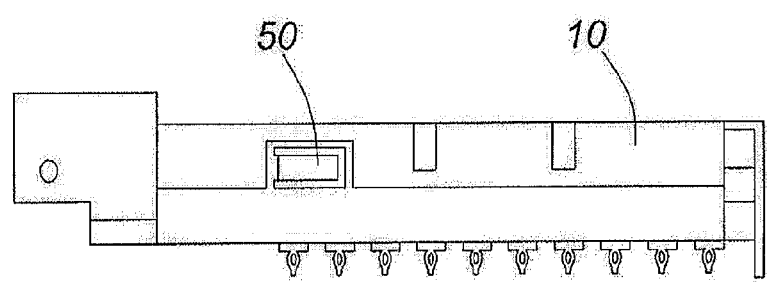
Figure 5C:
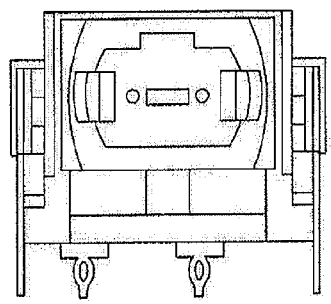
Figure 5D:
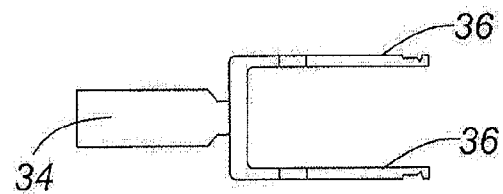
Figure 6A:
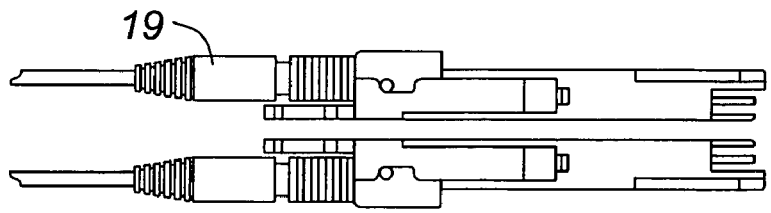
FIGS. 6A to 6D of an alternate asymmetrical embodiment with a short cut-away plate portion or handle.
Figure 6B:
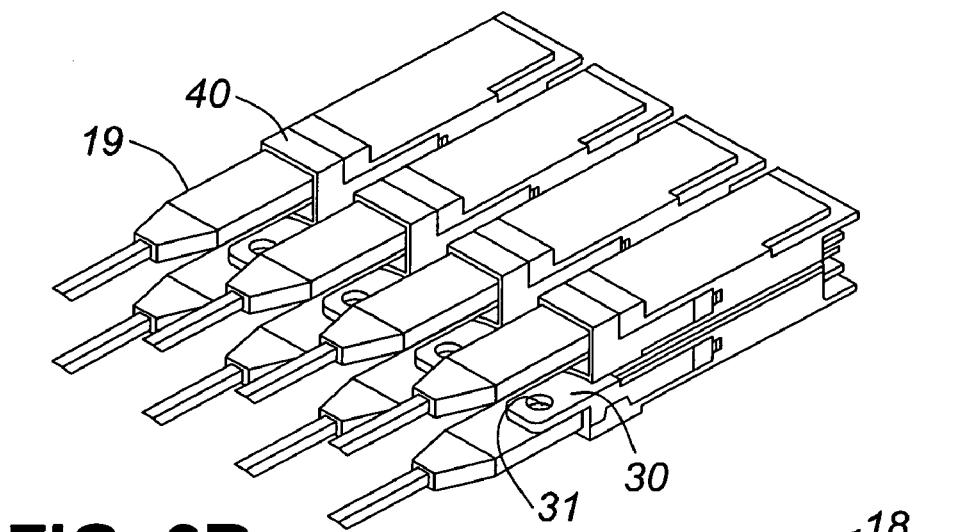
Figure 6C:
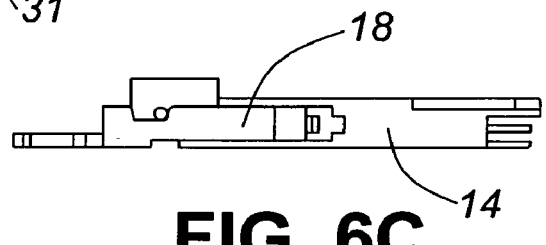
Figure 6D:
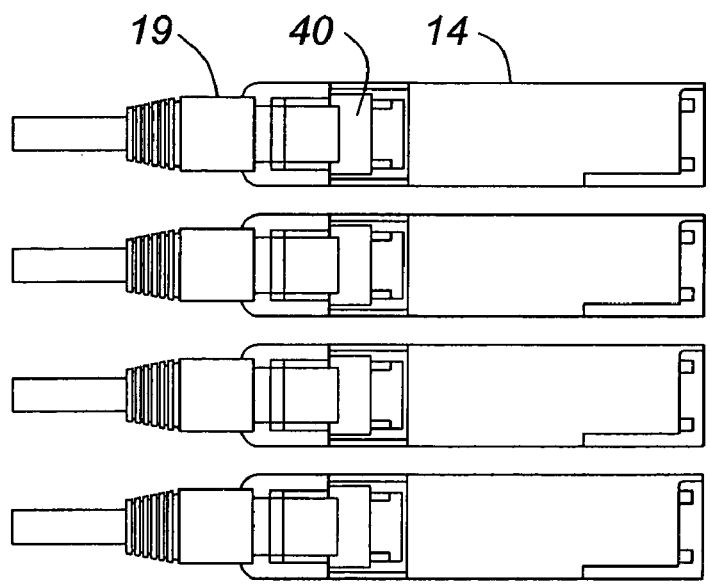

The embodiment shown in FIGS. 5A to 5C has a forked tool 34 for removing the module 14 from the cage 10. The tool 34 is used to extract the module 14 from the cage 10. In this embodiment, the module 14 is normally retained in the cage 10 by means of an inwardly biased spring 50, which engages a vertical ridge 39 in to side wall of to module to inhibit withdrawal of the module from the cage. In order to remove to module, to tool 34 is inserted into the cage between the sidewall 37 of to module and to interior surface of the sidewall of the cage 10. The arms 36 of the tool, which slide in a recess 38 of the sidewall of the module 14 over the ridge 39 (the ridge is shown in broken lines since it is hidden behind the arm 36 in the drawing), push the spring 50 out of engagement with the ridge of the sidewall of the module 14. The tool 34 also clamps onto the module 14 and thus allows it to be withdrawn from to cage.

FIGS. 6A to 6D show embodiments of the invention employing an asymmetrical plate or handle in a stacked configuration.

In a further embodiment the fiber is permanently attached to the module. Modules at both ends would form a self contained optical cable.

The invention can also be applied to other non QSFP MSA specific configurations, where a z-pluggable MPO/MTP fiber connector based parallel optical module is required in high-density configuration.

I claim:

1. An optic fiber connection arrangement comprising:
   an optical transceiver module insertable into a cage mounted on a support member, said module having a distal end for insertion in said cage and a proximal end;
   an optic fiber connector pluggable into a socket provided at the proximal end of said module;
   a releasably latchable frame attached to said module, said frame having spring-loaded limbs to permit said frame to be snapable into a locked position upon insertion of said module into said cage;
   said frame having a fixed protruding portion extending beyond said proximal end of said module parallel to said optic fiber connector and having an exposed end portion; and
   grasping means at said exposed end portion to permit the module to be released from the cage by pulling on said frame; and
   wherein said protruding portion comprises a pair of parallel side bars extending on either side of said optic fiber connector whereby said optic fiber connector lies between said parallel side bars and is exposed from above and below, and said parallel side bars terminating in a crosspiece lying outside a plane containing said optic fiber connector; and
   wherein said crosspiece provides said grasping means.

2. An optic fiber connection arrangement comprising:
   an optical transceiver module insertable into a cage mounted on a support member, said module having a distal end for insertion in said cage and a proximal end;

an optic fiber connector pluggable into a socket provided at the proximal end of said module;

a releasably latchable frame attached to said module, said frame having spring-loaded limbs to permit said frame to be snapable into a locked position upon insertion of said module into said cage;

said frame having a fixed protruding portion extending beyond said proximal end of said module parallel to said optic fiber connector and having an exposed end portion; and grasping means at said exposed end portion to permit the module to be released from the cage by pulling on said frame; and wherein said protruding portion comprises a flat asymmetric tongue extending below said optic fiber connector, said asymmetric tongue having a cut-away portion to expose said optic fiber connector from below; and wherein said tongue has a free end portion including a hole to provide said grasping means.

* * * * *